United States Patent [19]

Takada et al.

[11] Patent Number: 4,861,659
[45] Date of Patent: Aug. 29, 1989

[54] HIGH TENACITY ACRYLONITRILE FIBERS AND A PROCESS FOR PRODUCTION THEREOF

[75] Inventors: Takashi Takada; Kenichi Hirao, both of Otsu; Hiroyoshi Tanaka; Mitsuo Suzuki, both of Ehime, all of Japan

[73] Assignee: Toray Industries, Inc., Tokyo, Japan

[21] Appl. No.: 39,336

[22] Filed: Apr. 17, 1987

Related U.S. Application Data

[63] Continuation-in-part of Ser. No. 688,393, Jan. 2, 1985, abandoned.

[30] Foreign Application Priority Data

Jun. 19, 1984 [JP] Japan ................. 59-125818

[51] Int. Cl.4 ............................................. D02G 3/00
[52] U.S. Cl. ..................................... 428/364; 428/400; 526/341
[58] Field of Search ................. 428/364, 400; 526/341

[56] References Cited

U.S. PATENT DOCUMENTS

| | | | |
|---|---|---|---|
| 3,088,188 | 5/1963 | Knudsen | 428/400 |
| 4,421,708 | 12/1983 | Reichardt et al. | 526/341 X |
| 4,446,206 | 5/1984 | Fester et al. | 428/364 |
| 4,497,868 | 2/1985 | Reinehr et al. | 428/400 |
| 4,535,027 | 8/1985 | Kobashi et al. | 428/364 |

*Primary Examiner*—Lorraine T. Kendell
*Attorney, Agent, or Firm*—Armstrong, Nikaido, Marmelstein, Kubovcik & Murray

[57] ABSTRACT

High tenacity acrylonitrile fibers are provided.

The high tenacity acrylonitrile fibers comprise acrylonitrile polymers composed mainly of acrylonitrile having an intrinsic viscosity of at least 2.5 to 3.5 and having a degree of crystalline orientation measured by wide-angle X-ray diffraction within a range of 93–97%, a tensile strength of at least 10 g/d, an initial modulus of at least 180 g/d, a knot strength of 2.2 g/d and a surface smoothness.

A process for production of the high tenacity acrylonitrile fiber which comprises once extruding an acrylonitrile polymer solution having an intrinsic viscosity of 2.5 to 3.5 in air or in an inert gas through a spinning nozzle, then introducing into a coagulating bath, subjecting the resulting coagulated filaments to washing with water, drawing and drying, and then drawing the filaments under a drawing tension of about 1.0 to 2.5 g/d with dry heating at about 160° to about 250° C. to make the total drawing magnification about 10 or 25 times per an initial length of the coagulated filaments.

4 Claims, No Drawings

HIGH TENACITY ACRYLONITRILE FIBERS AND A PROCESS FOR PRODUCTION THEREOF

This application is a continuation-in-part of U.S. Ser. No. 88,393 filed Jan. 2, 1985, now abandoned.

BACKGROUND

The present invention relates to high tenacity acrylonitrile (hereinafter abbreviated as AN) fibers, particularly to novel AN fibers which comprise an AN polymer having a high degree of polymerization and having an extremely high mechanical strength, a remarkable smoothness at the surface thereof and a dense and homogeneous fiber structure, as compared to conventional and commercially available AN fibers. The present invention also relates to hydraulic substances reinforced with these fibers and a process for production thereof.

AN fibers have been hitherto produced and sold for use for clothing items in large quantities. However, it is an actual circumstance that little AN fibers have been employed for use as industrial materials because of unsatisfactory mechanical strength.

Many attempts to enhance or improve the mechanical properties of AN fibers have been proposed heretofore.

For example, Japanese Patent Publication Nos. 19414/70 and 29891/71 propose a process for producing a high tenacity acrylic fibers for use as industrial materials by introducing a solution of AN polymer into a coagulating bath through an inert gaseous medium to coagulate, namely a dry-jet wet spinning method, which comprises forming coagulated threads by a dry and wet spinning process, subjecting the fibers to washing, hot drawing, an after-treatment and drying, then secondary drawing and further subjecting to a heat treatment under a shrinkage allowance, particularly under the conditions such as above-described two-stage drawing and high speed winding.

However, as shown in Examples of the above Patent Publications, the strength of fibers produced by the above process is only of such a level as to be 3.2 to 4.9 g/d, and the fibers can hardly be utilized as industrial materials.

Further, a process which comprises subjecting fibers obtained by a wet or dry spinning method to wet drawing, drying under a tension, and subsequently subjecting to contact drawing to make an effective total drawing ratio of 9 to 25 times is proposed in Japanese Patent Application KOKAI (=laying-open) Publication No. 51810/82. It is described therein that high modulus AN fibers can be obtained by this process.

However, according to the process, the contact drawing is made subsequent to spinning by a wet spinning or dry spinning, and the level of strength of fibers obtained is so low as to be 9.2 g/d for the highest strength value of fibers obtained in the Examples of the Publication. Also, as clearly seen from the fact that the smoothness of the fiber surface is so poor that the greatest knot strength obtained in the Examples is 1.5 g/d, the fibers have only a low knot strength and are not much useful for practical utility as industrial use fibers.

Furthermore, a process which comprises subjecting a polymer having a relative viscosity of 2.5 to 6.0 to a dry or wet spinning method, washing or washing followed by wet drawing, drying on a heating roll in a tension state, drawing under dry heating and then heat-treating is proposed in Japanese Patent Application KOKAI Publication No. 161117/82; it is described therein that high tenacity AN fibers can be obtained by this process.

However, the strength of AN fibers obtained by the prior art is, for example, less than about 10 g/d at best in tensile strength. In addition, as the molecular weight or degree of polymerization of AN polymer employed increases, the AN fibers obtained often causes defects such as a mutual adhesion between the fibers etc. As a result of the defects, the AN fibers do not enhance or improve not only a tensile strength but also other mechanical properties such as an initial modulus, a knot strength, a heat resistance, etc.

Then, U.S. Pat. No. 4,535,027 discloses a process for producing a high strength AN fiber having a tensile strength of 20 g/d or above by way of a dry-jet wet spinning and a multi-stage drawing.

According to this process, however, use is made of an AN having a weight average molecular weight of 400,000 or above, so that the process involves a difficulty such that the viscosity of the spinning solution tends to be so high that it becomes extremely difficult to operate the spinning.

In practice, now that fibers are produced by drawing to a high draw ratio exceeding 25 times, a sufficient degree of the molecular orientation can be obtained in the fiber axial direction but the fibers tend to be insufficiently strong in the direction perpendicular to the fiber axial direction. That is to say, fibers are prone to undergo fibrilation when subjected to friction, are relatively poor in the knot strength, the frictional abrasion resistance and so forth so that they are poor in the practical usefulness as reinforcing fibers in or for industrial material and composite material.

On the other hand, asbestos has been hitherto used as reinforcements of hydraulic substances such as cement or gypsum. Methods for producing asbestos-reinforced plane plates, corrugated plate slates, etc. include wet paper-making methods of cylinder mould type and fourdrinier type. Among them, a cylinder mould type paper-making method called a Hatcheck's method has received a reputation as a preferable method for past several ten years. The asbestos fibers for reinforcing cement have a very good affinity and a strong adhesion force to cement matrix. The presence of long fibers with short fibers in an appropriately mixed state enhances an efficiency of paper-making and makes a reinforcing effect satisfactory and, the asbestos fibers are thus ideal fibers for use in cement reinforcement.

However, from a situation that harmful nature of asbestos fibers in handling becomes a problem on a world-wide basis, it has been actually expected to develop substitute materials for asbestos. As substitute materials for asbestos fibers, inorganic and organic fibers such as glass, polyethylene, polypropylene, nylon, polyacryl, polyvinyl alcohol, carbon, aramide, alumina fibers, etc. have been attempted to be utilized.

In order to obtain a cement plate having an excellent reinforcing effect and durability in a papermaking method, the following requirements should be met, namely:

(1) Fibers having a small diameter be separated from each other without being entangled and uniformly dispersed in a cement suspension (slurry).

(2) Affinity of fibers to cement which greatly affects a paper-making property and a reinforcing effect be good and adhesion between fibers and a cement be strong.

(3) Durability, particularly alkali resistance, be excellent; etc.

However, the organic and inorganic fibers which have been attempted to be utilized heretofore did not satisfy all of the requirements described above.

For example, fibers such as polyethylene, polypropylene, nylon, etc. only have poor strength and poor tensile modulus. Further, adhesive force to cement matrix is weak. Thus, no satisfactory reinforcing effect can be obtained. Glass fibers have a poor alkali resistance and an unsatisfactory adhesion force. Further, aramide fibers and carbon fibers have poor dispersibility, weak adhesion force and are costly. Therefore, these fibers have not been adopted yet. Further, polyvinyl alcohol fibers and acrylic fibers promise a bright future as fibers substitutable for asbestos because alkali resistance is good and adhesion to cement matrix is strong. However, polyvinyl alcohol fibers encounter a problem in costs. Acrylic fibers have a poor tensile strength and a poor initial modulus; accordingly, hydraulic substances having high efficiencies such as slates having a high bending strength, etc. cannot be obtained from these fibers.

On the other hand, various methods for improving efficiencies, e.g., bending strength, etc., of hydraulic substances reinforced with the aforesaid acrylic fibers have been proposed in recent years. For example, in Japanese Patent Application KOKAI Publication No. 170869/82 (U.S. Pat. No. 4,446,206), there is disclosed a hydraulic substance reinforced with acrylic fibers which contain 98 to 100% of acrylonitrile and have a tensile strength of at least 50 CN/tex (5.65 g/d) and a tensile elongation of at most 15%.

However, acrylic fibers concretely described in the above-described publication are all obtained by subjecting acrylonitrile type polymers to wet spinning. The thus obtained fibers merely possess a tensile strength of at most 85 CN/tex (9.63 g/d) and a tensile modulus of at most 1510 CN/tex (171.1 g/d). A bending strength of cement reinforced with these acrylic fibers is considerably inferior to that of conventional asbestos-reinforced cement. In addition, a bending strength of a cement reinforced with acrylic fibers showing the highest tensile strength of 9.63 g/d is not necessarily large but a relatively considerably low bending strength is merely obtained.

The utility is only limited, of such fibers as having a strength of the above-mentioned level. Also, as before stated, according to the above methods fibers are produced by a wet spinning, so that the fibers have defects on the surface condition or fail to have a desirable surface smoothness, and because of this, the fibers are relatively low in the knot strength and prone to fibrilation when subjected to friction of abrasion, and are relatively low also in the toughness. For example, when the fibers are used as reinforcing fibers in cement, it is difficult to obtain a cement product having desirable properties such as for example a desirably high impact strength.

Further, hydraulic substances reinforced with conventional asbestos are brittle due to remarkably small work load of rupture in bending and low impact strength, which often causes damages in building and construction sites.

Furthermore, it is generally observed that an impact strength of hydraulic substances reinforced with synthetic fibers such as acrylic fibers, etc. described above would be improved. However, the improvement is unsatisfactory yet. It has thus been desired to develop hydraulic substances having not only an improved bending strength but also a high impact strength.

On the other hand, various methods for enhancing an cohesion between fibers and cement particles in a slurry state of cement and improving a paper-making property have also been proposed. For example, in Japanese Patent Application KOKAI Publication No. 62833/80, there is disclosed a process for producing a cement plate which comprises adding 10 to 800 ppm of a flocculant selected from strong anionic, medium cationic and weakly cationic flocculant to a cement slurry having formulated no asbestos fibers and then subjecting a cement plate to paper-making.

However, cohesion between fibers and cement particles is hardly achieved and fibers are easily separated from cement particles b a shearing force at a paper-making step to cause heterogenecity of the slurry, while improvement in a paper-making efficiency is expected to a certain extent in this process because flocs of cement particles are formed by the addition of the flocculant and thus, outflow of cement particles from a wire cylinder is prevented at the paper-making step. After all, no improvement in property of the thus obtained cement plate after molding can be expected.

Furthermore, a process for reinforcement of cement materials using polyvinyl alcohol synthetic fibers having coated thereon 0.01 to 3 wt % of anionic or/and nonionic surfactants and a cationic oil is disclosed in Japanese Patent Application KOKAI Publication No. 134553/81. Further in Japanese Patent Application KOKAI Publication No. 13455/81, a process which comprises using a cationic oil and a nonionic or amphoteric surfactant in combination as a treating agent is disclosed.

However, when these processes are used, these processes encounter a drawback that due to unsatisfactory paper-making efficiency, namely, due to unsatisfactory cohesion between fibers and cement particles in a slurry state, paper-making cannot be performed efficiently while an effect of improving adhesion between fibers and cement particles in cement articles, that is, an effect of improving bending strength, can be expected to a certain extent.

As described above, in the case of preparing cement plates through a paper-making process, it is important that cement particles be firmly fixed on the surfaces of fibers in large quantities at a paper-making step, a uniformly dispersed slurry be obtained and, at the same time, a felt material having good uniformity be formed by a cylinder mould machine or a fourdrinier machine while maintaining the firmly fixed state and the uniformly dispersed state. In the prior art processes, however, cohesion between fibers and cement particles in a slurry state or dispersibility of the slurry is insufficient so that paper-making efficiency is not always satisfactory. As a result, it has been prevented to improve properties of cement plate.

SUMMARY

As a result of extensive investigations on high tenacity AN fibers having improved and enhanced mechanical properties in total to a high degree, including tensile strength, a knot strength, an initial modulus, surface smoothness, etc. of AN fibers, and hydraulic substances reinforced with these fibers, the present inventors have arrived the present invention.

In other words, it is a primary object of the present invention to provide an improved AN fiber which has remarkably improved mechanical strength characteristics and which is useful not only for fabric or clothing material but also for industrial utility, particularly as reinforcing fiber for composite material and, for example, as substitute for asbestos in slate.

Another object of the present invention is to provide a process for production of such AN fibers on an industrial scale.

A further object of the present invention is to provide hydraulic substances having excellent bending strength and excellent resistance to impact at low costs and a process for production of such hydraulic substances with extremely good paper-making efficiency.

THE PREFERRED EMBODIMENTS

These objects of the present invention can be achieved by high tenacity AN fibers comprising an AN polymer mainly composed of AN having an intrinsic viscosity of 2.5 to 3.5, preferably 2.6 to 3.5, more preferably 2.7 to 3.3, and having a degree of crystalline orientation measured by wide-angle X-ray diffraction within a range of 93 to 97%, preferably 94 to 97%, a tensile strength of at least 10 g/d, preferably at least 12 g/d, an initial modulus of at least 180 g/d, preferably at least 200 g/d, a knot strength of at least 2.2 g/d, preferably at least 2.5 g/d, more preferably at least 3.0 g/d, and a surface smoothness.

The term "a degree of crystalline orientation" as used herein refers to a measure showing a degree of orientation of AN polymer molecular chains constituting the fibers at the fiber axis direction and is a value determined by the following measurement method.

Method for Measurement of a Degree of Crystalline Orientation

The degree of orientation is a value calculated by the following formula using a half width value (H) determined by measuring distribution of diffraction strength in the azimuthal direction, paying attention to crystalline reflection having the maximum strength on the equator line at a scattering angle of 16° to 17°, in an X ray diffraction pattern of AN fibers.

$$\text{a degree of orientation (\%)} = \frac{180 - H}{180} \times 100$$

The characteristic feature of the present invention lies in AN polymers having a relatively high degree of polymerization, namely, having 2.5 to 3.5 when expressed with an intrinsic viscosity, as compared with AN polymers conventional, commercially available AN fibers. Because fibers are composed of polymers having such a high degree of polymerization, not only a tensile strength exceeding about 10 g/d is exhibited but also other mechanical properties show extremely large values. More importantly, notwithstanding that the AN fibers of the present invention are composed of polymers having such a high degree of polymerization degree, the AN fibers are fibers having a high degree of orientation of 93 to 97% measured by wide-angle X-ray diffraction. Only by the facts that the fibers have such a specific orientation and are composed of the aforesaid highly polymerized polymers, super high tenacity mechanical properties that have not been considered for AN fibers heretofore are exhibited.

That is, in conventional synthetic fibers, especially AN fibers, an increased polymerization degree of polymers which constitute fibers results in increase of a viscosity of a spinning solution so that spinning becomes difficult. It is thus required to decrease a concentration of a polymer.

Decrease of the polymer concentration in a spinning solution is accompanied by desolvation in large quantities after forming filaments. Accordingly, a fiber structure becomes porous and tends to loose its transparency, which fails to achieve strength to a high degree. Further, the characteristic feature of the AN fibers of the present invention also lies in smooth fiber surfaces, specifically in smooth surfaces having a contrast glossiness of at least 7%, preferably at least 10%, more preferably 15 to 30%.

The term "glossiness of fiber surfaces" as used herein refers to a value determined by the following measurement method and, reflects smoothness of fibers at the surfaces thereof and at the same time, dense and homogeneous fiber structure.

Method for Measurement of Glossiness at Surface

A fiber bundle is arranged parallel.

In case of crimpled threads, the effect of crimpling is removed of the threads in hot water maintained at 90° to 100° C. in order to avoid an error attributable thereto. If necessary in order to effectively remove the effect of crimpling and obtain samples of straight threads, stretching of a more or less degree may be operated.

Straight threads of at least about 30 cm in length are parallel arranged and fixed on a cell. (For means for parallel arranging the threads, for example it may be operated to fix respective one ends of the threads in position and flow water towards the respective other ends of the threads so as to have enhanced the parallelism in which the threads are arranged. In this case, drying should be effected at a temperature of 65° C. at the highest. A light is given to the surface of this sample from one direction and, reflection lights are divided into a regular reflection component (a) and a diffuse reflection component (b). A ratio of both components is made a contrast glossiness.

$$\text{contrast glossiness} = (1 - b/a) \times 100$$

Namely, in case that polymers are generally dissolved in various solvents, the resulting polymer solution in solvents is used as a spinning dope and the dope is converted into fibers by applying means of wet, dry or dry-jet wet spinning, etc., without subjecting polymers to melt spinning as they are, as in AN fibers, desolvation is required. Generally desolvation is performed using water; however, shrinkage in volume cannot be followed as desolvation proceeds and accordingly, voids are formed. In order to remove the voids, drying is performed to make the dense and homogeneous structure fine. However, as pointed out in the Journal of Fiber Association, vol. 29, No. 8 (1973), a decreased polymer concentration results in coagulated filaments rich of voids. Accordingly, it is difficult to remove voids and properties of strength and elongation become poor, even after a drying step.

On the other hand, an increased polymerization degree results in an increased viscosity of a spinning solution when a polymer is dissolved in a solvent. From viewpoints of stability of the spinning solution and fiber-forming property, it cannot be helped to decrease the polymer concentration. Therefore, it becomes difficult to make a dense and homogeneous structure due to adverse influence caused by reduction in a polymer concentration with a polymer having a high degree of polymerization. Thus, fibers having a high tenacity are not always obtained.

The basic characteristic of the AN fibers according to the present invention resides in that the AN fibers are composed of a polymer of a high polymerization degree having an intrinsic viscosity of 2.5 to 3.5 and such a polymer of a high polymerization degree is highly oriented toward the fiber axis direction to a high value of 93–97% when expressed by X ray crystalline orientation degree. By the basic characteristic, superb mechanical properties, for example, physical properties such as a tensile strength of at least 10 g/d, preferably more than 12 g/d, an initial modulus of at least 180 g/d and a knot strength of 2.2 g/d or more, preferably more than 2.5 g/d, more preferably more than 3.0 g/d, are exhibited. In addition, the fibers of the present invention possess a minimized drawback at the surface thereof because they have the surface showing a high contrast glossiness of at least 7%, preferably 10% or more, generally in the range of 15 to 30%, when expressed with contrast glossiness. In addition, the fibers are excellent in their fineness so that high mechanical fibers having a high initial modulus and further resistant to bending or friction can be obtained.

To produce the fibers of the present invention having excellent mechanical properties and efficiencies as described above, it is required that a polymerization degree of a polymer constituting the fibers be made high and the polymer be highly oriented to the fiber axis direction. It is thus difficult to prepare the fibers of the present invention by a wet or dry spinning process most widely adopted for industrially producing AN fibers. It becomes possible to obtain super high tenacity AN fibers of the present invention only by a dry-jet wet spinning process described below in detail. That is, AN polymers are dissolved in solvents. The resulting spinning solution is once extruded into air or an inert gas, preferably in air, through a spinning nozzle. The extruded multifilaments are introduced into a coagulating bath via a gaseous minute space to cause coagulation there. In combination with this process, further specific steps for the production and for the conditions are adopted, thereby AN fibers of the present invention can be obtained.

Hereafter, the process for production of the AN fibers according to the present invention will be described in detail.

The AN polymers used in the present invention are AN homopolymers or AN copolymers containing at least 90 mol % of AN, preferably 95 to 100 mol % of AN and less than 5 mol %, preferably 0 to 5 mol %, of vinyl compounds copolymerizable with AN. When the ratio of the vinyl compounds to be copolymerized exceeds 5 mol %, heat resistance of the resulting fibers are reduced, which is not preferred for the purpose of achieving the objects of the present invention.

Any compounds are usable as the above-described vinyl compounds in the present invention, but are not particularly limited as far as the compounds are copolymerizable with AN. Preferred examples of copolymerizable components include acrylic acid, itaconic acid, methyl acrylate, methyl methacrylate, vinyl acetate, sodium allylsulfonate, sodium methallylsulfonate, sodium p-styrenesulfonate, etc.

These AN polymers are dissolved in solvents thereof such as organic solvents, for example, dimethylsulfoxide (DMSO), dimethylformamide (DMA), dimethylacetamide (DMAc), ethylene carbonate, butyl lactone, etc.; a conc. aqueous solution of water soluble inorganic salts such as zinc chloride, calcium chloride, lithium bromide, sodium thiocyanate, etc. The thus obtained polymer solution is used as a spinning solution, i.e., a spinning dope.

It is preferred that the polymer concentration of the spinning solution be in a range of about 5 to about 20 wt %, preferably 10 to 18 wt %. When the polymer concentration is lower than 5 wt %, density and homogenity of the fibers becomes worse so that properties of strength and elongation are deteriorated and production costs become disadvantageous, which are not preferred. When the polymer concentration exceeds 20 wt %, the viscosity of the spinning solution becomes excessively high so that the stability of the spinning solution and fiber-forming property become worse, which are not preferred.

It is required that the viscosity of the spinning solution be at least 1,500 poise at 45° C., preferably 3,000 to 10,000 poise. When the viscosity of the spinning solution is lower than 1,500 poise at 45° C., a coagulation structure becomes worse so that strength decreases.

This concentration of the spinning solution is extremely important in the dry-jet wet spinning process adopted in the present invention. Only when the polymer concentration and viscosity of the spinning solution described above are within the ranges described above, it becomes possible to perform spinning stably and obtain high tenacity fibers having a high initial modulus, a high knot strength and surface smoothness in the dry-jet wet spinning process, without causing troubles of drip, fiber breaking, etc.

It is preferred that the temperature of the spinning solution be maintained generally in the range of 30° to 100° C. because temperatures lower than 0° C. cause drawbacks that the viscosity of the spinning solution becomes high so that gelation easily occurs to make spinning difficult and temperatures higher than 130° C. encounter drawbacks that stability of solvent or the spinning solution becomes poor, etc.

The thus adjusted spinning solution is subjected to the dry-jet wet spinning process. In this case, it is preferred that a distance between a nozzle surface and a liquid surface of a coagulating bath be set forth in the range of about 1 to about 20 mm, preferably 2 to 10 mm. When the distance is shorter than 1 mm, problems that the nozzle surface is contacted with the liquid surface, etc. tend to occur and such is not preferred. When the distance exceeds 20 mm, extruded filaments tend to break and adhere or stick one another, which are not preferred.

In such a dry-jet wet spinning process, when a spinning draft is too large, filaments-breaking, etc. tend to occur; when the draft is too low, it causes cohesion between single yarns and unevenness of yarns. Accordingly, it is preferred that the spinning draft be in the range of 0.1 to 1.5, more preferably 0.2 to 0.8.

As a coagulating bath, there is used water or an aqueous solution of solvent for the aforesaid AN polymers in solvents used for wet or dry and wet spinning processes of known AN fibers, for example, an aqueous solution of the solvent having a concentration of 10 to 80 wt % and a temperature of 0° to 35° C.

The thus obtained coagulated filaments are subjected to conventional, known post treatments, that is, treatments such as washing, drawing, drying, etc. In the present invention, it is required that the fibers after drying be subjected to dry drawing. Only by dry drawing the AN fibers obtained by the dry-jet wet spinning process, it becomes possible to convert AN fibers into the AN fibers having smooth surface composed of a highly polymerized polymer having an intrinsic viscosity of 2.5 to 3.5 and having a high orientation of 93 to 97% in the X-ray crystalline orientation, i.e., the high tenacity fibers.

Subsequent to coagulation and washing, the AN fibers obtained by the dry-jet wet spinning process are subjected to a wet drawing at a draw ratio within a range of 2 to 10 times or, more preferably, 3 to 6 times, and then dried. Thereafter, a dry drawing is carried out on hot rollers, hot plates or in a heated air bath to a temperature of 160° to 250° C., preferably 180° to 220° C. while maintaining the filaments in a drawing tension of 1 g/d to 2.5 g/d, preferably 1.5 to 2.5 g/d. When the magnification for the primary drawing is less than 2 times, dense and homogeneous filaments cannot be obtained; such is not preferred. When the magnification exceeds 10 times, cohesion tends to occur upon drying, which is not preferred. When the drawing tension is lower than 1 g/d in the dry drawing described above, sufficient orientation is accompanied so that neither sufficient strength nor sufficient initial modulus can be obtained. When the drawing tension exceeds 2.5 g/d, no sufficient magnification for the drawing can be obtained, or, the drawing is accompanied by rupture; such is not preferred.

One of the characteristics of the present invention lies in that fibers which are, subsequent to a dry-jet wet spinning, subjected to washing with water, a wet drawing and drying, are subjected to a dry hot drawing at a draw ratio of 1.5 to 5 times under a drawing tension of 1 to 2.5 g/d as stated above to obtain a total drawing magnification within a range of 10 to 25 times. By setting the total drawing magnification to be 25 time or below or, more preferably, 20 times or below, it is feasible to produce AN fibers which do not bear a surface defect and which have a strength, an initial modulus and a knot strength which all are remarkably high. By operating a drawing at such a high draw ratio exceeding 25 times as in the U.S. Pat. No. 4,535,027 above referred to, a surface defect is highly likely to occur, and fibers then obtainable are only such ones as having relatively poor bend characteristics such as a low knot strength and a low frictional abrasion resistance.

The drawing magnification in the heat drawing varies depending upon drawing hysteresis of filaments to be subjected to heat drawing and is set forth in the range wherein the total drawing magnification of the drawn threads finally obtained becomes approximately 10 to 25 times. For example, in the case of filaments obtained by subjecting to the dry-jet wet spinning process, washing with water and then subjecting to primary drawing to approximately 2 to 10 times, dry-drawing is carried out to achieve 1.5 to 5 times, preferably 2 to 4 times; in the case of filaments not subjected to such drawing, the filaments are drawn to achieve the aforesaid total drawing magnification of 10 to 25 times, preferably 10 to 20 times, by performing heat-drawing at one step or multi-step.

Further when the temperature in the dry drawing is lower than 150° C., no satisfactory magnification for the drawing can be obtained; such is not preferred. On the other hand, when the temperature exceeds 250° C., reduction in drawability based on insufficient heat resistance of fibers is accompanied; such is not preferred.

As concrete means for dry drawing, it is preferred that drawing be performed using a tubular heating cylinder capable of supplying and exhausting heating air, while passing filaments through the heating cylinder maintained at a fixed temperature.

Using the tubular heating cylinder, fibers can be drawn in a non-contact manner of operation, without subjecting the fibers to abrasion, so that such AN fibers can be produced as having little surface defect and being remarkable in respect of not only the tensile strength but also the knot strength and the frictional abrasion resistance.

Further, it is preferred that a single yarn denier be less than 3.0 d, preferably less than 2.0 d.

The AN fiber as obtained above according to the present invention comprises such a polymer of a high degree of polymerization which has an intrinsic viscosity within a range of 2.5 to 3.5, that is, a number average molecular weight within a range of about 239,000 to 382,000 and yet can be produced by an applied use of the conventionally industrially employed means for polymerization, and which is highly oriented as shown by an X-ray crystalline orientation of 93 to 97%.

In addition, the fiber has highly desirable mechanical properties not only such that the tensile strength is so high as to be at least 10 g/d but also such that, due to the employment of the above-mentioned dry-jet wet spinning process and dry drawing, the knot strength is at least 2.2 g/d and the initial modulus is at least 180 g/d.

Moreover, the AN fiber according to the present invention has a smooth surface, and the characteristic of this smooth surface is represented by a contrast glossiness of preferably at least 7%.

AN fibers having a smooth surface as above have a strong resistance against bending, are hardly prone to fibrilation and have a high frictional abrasion resistance. Also, it being smooth, the surface of fibers can be easily wetted and the content of bubbles in fibers can be suppressed.

The initial modulus represents an important characteristic of fibers according to the present invention for use of the fibers in or for a compound material. For example, in the case of tire cords used for a rubber reinforcing fiber, reinforcing fibers having a higher value of the initial modulus can provide tires having an enhanced steering or driving stability.

The AN fiber according to the present invention has such a high initial modulus as to be 180 g/d, and it therefore can provide a highly desirable reinforcing fiber.

The knot strength is one of factors representing the resistance of fibers against bending, and for use for industrial material, fibers should preferably have a high value of not only the tensile strength but also the knot strength. With conventional AN fibers, when a drawing is effected at an excessively high ratio, there tends to occur a lowering of the knot strength and the frictional abrasion resistance, and such an AN fiber as having a tensile strength of 10 g/d or above and a knot strength of 2.2 g/d or above has never before been obtained. It has been ascertained that using an AN fiber having a high knot strength for a cement reinforcing material, the impact resistance of the cement product then obtainable can be considerably enhanced. Because of these advantages, the AN fibers of the present invention can be used for as industrial materials and in many fields for reinforcing fibers, specifically as canvas, asbestos substitute, sawing thread, hose, heavy cloth, etc. The AN fibers are particularly useful as substitute fibers for asbestos.

Next, hydraulic substances reinforced with the fibers of the present invention and a process for production thereof will be described below.

In order to obtain fiber-reinforced hydraulic substances having excellent bending strength and impact strength aimed at the present invention, it is important firstly to use the above-described high tenacity AN fibers having a high initial modulus and secondly to use high tenacity AN fibers having a high initial modulus obtained by applying a nonionic high molecular flocculant or a cationic high molecular flocculant, as reinforcing fibers.

It is desired that the length of the reinforcing fibers be in the range of 0.5 to 15 mm. Further it is appropriate that an amount of the fibers to be incorporated into a cement be in the range of 0.5 to 5 wt %. When the amount is less than 0.5 wt %, no sufficiently reinforcing effect is exhibited. When the amount exceeds the upper limit, dispersibility becomes worse so that any improvement in the reinforcing effect cannot be expected.

The use of fibryl fibers such as pulps auxiliary in addition to the aforesaid AN fibers can prevent loss of cement at the paper-making step and as a result, an efficiency of paper-making is more improved.

For the same purpose, AN type fibryl fibers, aromatic polyamide type fibryl fibers and a small quantity of asbestos, etc. can also be used in combination.

The term "hydraulic substance" as used in the present invention refers to an inorganic substance which is hardened by hydration. Examples of such hydraulic substances include portland cement, alumina cement, slug cement, silica cement, gypsum, calcium silicate, etc. In order to impart a porous structure or a lightweight structure to these hydraulic substances, perlite, sand balloon, glass balloon, etc. may also be incorporated.

The high molecular flocculants which can be employed in the present invention include the following: nonionic high molecular flocculants are high molecular electrolytes having many neutral polar groups such as a $-CONH_2-$ group, a $-O-$ group, etc., for example, polyacrylamide, polyethylene oxide, starch guar gum, locus bean gum, gelatin, etc. Of these, particularly preferred is polyacrylamide. Cationic high molecular flocculants are high molecular electrolytes having cationic functional groups such as an amine, a salt of an amine, a quaternary salt, etc., for example, polyalkylaminoacrylates or methacrylates, copolymers of aminoalkyl acrylates or methacrylates and acrylamide, Mannich-modified polyacrylamides, polyethyleneimine, polyamine, cyclized polymers of dially ammonium halides and copolymers thereof with sulfur dioxide, polyvinylimidazoline, water soluble aniline resin hydrochloride, hexamethylenediamine-epichlorohydrin polycondensate, chitosan, etc. Of these high molecular flocculants, polyacrylamide type, polyacrylate type and polymethacrylate type are particularly preferred from viewpoints of alkali resistance and flocculating property.

It is appropriate that a molecular weight of these high molecular flocculants be in the range of 1,000,000 to 15,000,000, preferably 3,000,000 to 10,000,000, from a viewpoint of bridging and adsorption to cement particles as will be later described.

It is preferred that the pick-up of these high molecular flocculants onto the fiber be in the range of 0.01 to 1 wt %, desirably 0.05 to 0.6 wt %. When the pick-up is less than the lower limit, adhesion between cement matrix and fibers is poor. When the pick-up is larger than the upper limit, fibers are adhered to each other so that dispersibility of fibers in a cement slurry is seriously reduced.

To apply the high molecular flocculants to fibers is effected by immersing fibers in an about 0.1% aqueous solution of a high molecular flocculant and then dehydrating appropriately by means of a squeezing roller, centrifugation, etc. In this case, it is desired that the dehydrated fibers are kept in moist state, after applying the aqueous solution of a high molecular flocculant to fibers results in reduction of dispersibility in water and cohesion between fibers and cement particles.

As such, fiber-reinforced hydraulic substances are prepared by uniformly dispersing the high tenacity AN fibers having a high tensile modulus, to which the nonionic or cationic high molecular flocculant being applied in water together with a hydraulic substance such as cement or the like, then adding an anionic high molecular flocculant to the resulting slurry to make cement particles flocculate and adsorb to the surface of the aforesaid AN fibers, and subjecting the resulting slurry to paper-making.

A method for cohesion between fibers and cement particles in the present invention involves utilization of a flocculating effect of the high molecular flocculant, which is effected by coagulation due to neutralization of electric charges and bridging by high molecular chains. That is, cement particles are flocculated with the anionic high molecular flocculant to form a floc. At the same time, the floc is adsorbed to and bridged with the nonionic or cationic high molecular flocculant at the surface of the fibers, thereby to effect cohesion between the fibers and the cement particles. Accordingly, the ionic nature of the high molecular flocculant to be applied to the fibers is desirably cationic but, nonionic high molecular flocculants can also be employed since the bridging effect of the high molecular chains also contributes to flocculation. However, when anionic high molecular flocculants having counter ions are applied to the fibers, electric repellation generates, resulting in failure to achieve cohesion between the fibers and the cement particles. In this sense, it is important in the cohesion of the present invention that the molecular chains of the high molecular flocculants be both sufficiently large.

As the anionic high molecular flocculants which can be used for adsorption of cement particles to the surface of the fibers and bridging the same with the surface of the fibers, high molecular electrolytes containing $-CO_2-$ group are preferred. Examples of such anionic high molecular flocculants include polyacrylamide partial hydrolysate, sodium polyacrylate, copolymer of sodium acrylate and acrylic amide, sulfomethylated polyacrylamide, sodium alginate, CMC-Na, etc. Of these, particularly preferred are polyacrylamide type such as polyacrylamide partial hydrolysate, copolymers of acrylic amide and sodium acrylate, etc.

It is preferred that the molecular weight be in the range of 1,000,000 to 15,000,000. When the molecular weight is outside this range, flocculation capability is markedly reduced, or, conversely floc becomes coarse to cause non-uniformity of the resulting slurry; these cause reduction in an efficiency of paper-making.

On the other hand, when the molecular weight of the aforesaid anionic high molecular flocculants is particularly in the range of 4,000,000 to 9,000,000, a floc of cement particles adsorbed to and bridged with the surface of the fibers becomes a fine and appropriate size, dispersibility of the fibers and slurry is improved and bending strength of the obtained cement plate markedly increases.

It is appropriate that the amount of these anionic high molecular flocculant to be added be 30 to 600 ppm based on the solid content in the slurry, in view of flocculating efficiency and paper-making efficiency. Further the use of inorganic flocculants in combination with the aforesaid anionic high molecular flocculant results in a fine floc which is to be formed when cohesion occurs. In addition, the floc becomes strong and has a strong resistance to a shearing force at a step of preparing a slate by the paper-making process. As a result, a paper-making efficiency is further improved. Examples of the inorganic flocculants used herein include substances which form cationic colloid ions in water, such as aluminum sulfate, sodium aluminate, ferrous sulfate, ferric sulfate, ferric chloride, aluminum polychloride, etc. Of these, aluminum sulfate is preferred.

Further for purposes of exhibiting the efficiency of the aforesaid high molecular flocculants and inorganic flocculants and enhancing the effects of the flocculants, flocculating aids such as slaked lime, soda ash, sodium silicate, bentonite, fly ash, etc. can also be used, of course.

Hereinabove, the cases in which high tenacity AN fibers having a high modulus of elasticity are used as reinforcing fibers have been described but, acrylic fibers having a tensile modulus of 120 g/d or more and a strength of 5 g/d or more, preferably 6 g/d or more are also applicable to the present invention, of course.

The hydraulic substances of the present invention have not only a high bending strength but also a large work load of rupture in bending and a large impact strength, i.e., are excellent in capability of absorbing energy in rupture, since the hydraulic substances are reinforced with the high tenacity acrylic fibers having a high modulus of elasticity. The highly efficient hydraulic substances of the present invention are not ever achieved with conventional acrylic fibers but can be accomplished by using the high tenacity acrylic fibers having a high tensile modulus for the first time. This is assumed to be not only because the acrylic reinforcing fibers have a high tenacity, a high knot strength and a high tensile modulus but also because both the smoothness at the surface of the fibers and the uniformity of the structure of the fibers in the inner and outer layers thereof would act effectively. Accordingly, the hydraulic substances reinforced with the acrylic fibers of the present invention have a bending strength comparable to conventional asbestos-reinforced substances and, at the same time, possess much far excellent impact resistance.

In the present invention, a slurry in which large quantities of cement particles are fixed to the surface of the fibers, cohesion is extremely strong and dispersibility is good can be obtained by forming an aqueous suspension from AN fibers having applied thereto the nonionic or cationic high molecular flocculant and cement particles as described above and adding the anionic high molecular flocculant thereto. This slurry can sufficiently withstand the shearing force at the paper-making step. Accordingly, loss of cement which passes through a wire mesh upon paper making is minimized, the solid content to be formed on the wire mesh increases and an efficiency of paper-making can be greatly improved. Further because of good dispersibility of the fibers and good adhesion to cement, the impact strength and the bending strength of the thus formed cement plate by paper-making is large and a highly reinforcing effect can be attained. Therefore, the process for production of the fiber-reinforced cement plate in accordance with the present invention is extremely useful for manufacturing various slate products, molding articles, etc. in building and constructing fields.

EXAMPLES 1 TO 3 AND COMPARISON EXAMPLES 1 TO 7

100% AN was subjected to solution polymerization in DMSO to prepare five kinds of AN polymers having intrinsic viscosities of 1.3, 1.9, 2.6, 3.0 and 3.3, respectively.

Viscosities (45° C.) of these five polymers were adjusted to approximately 3,000 poise, respectively, to prepare spinning solution. Using the thus obtained five spinning solutions, spinning was conducted by two processes, i.e., a wet spinning process and a dry-jet wet spinning process. In each spinning process, a 55% DMSO aqueous solution at 20° C. was used as a coagulating bath.

In the case of the dry-jet wet spinning process, the distance between a spinning nozzle and the liquid surface of the coagulating bath was set 5 mm apart from each other and, the distance from the liquid surface of the coagulating bath to focusing guide was set 400 mm apart.

After washing the obtained undrawn filaments with water, the filaments were drawn by 5 times in hot water. After imparting an oil thereto, the drawn filaments were dried at 130° C. to render the structure dense and homogeneous. Then, the filaments were drawn in a dry heating tube having a temperature atmosphere of 190° C. to 200° C. The drawing filaments having the maximum drawing magnification of 90% were subjected to sampling and, physical properties of the fibers were measured. The results are shown in Table 1 below.

The degree of crystalline orientations of the fibers obtained in Examples 1 to 3 were 94.8%, 94.6% and 94.3%, respectively. The contrast glossinesses were 20.5%, 22.2% and 22.8%, respectively, which were all higher than wide-angle of crystalline orientation of 91.5% and relative glossiness of 5.3% in Comparison Example 7.

TABLE 1

| Spinning Method | Intrinsic Viscosity | Drawing Magnification (Times) | Tensile Strength (g/d) | Initial Modulus (g/d) | Knot Strength (g/d) | Crystalline Orientation Degree (%) | Contrast Glossiness (%) |
| --- | --- | --- | --- | --- | --- | --- | --- |
| Example 1 dry-jet wet | 3.3 | 13.7 | 12.9 | 227 | 3.2 | 94.8 | 20.5 |
| Example 2 | 3.0 | 13.5 | 12.5 | 220 | 3.1 | 94.6 | 22.2 |

TABLE 1-continued

| Spinning Method | Intrinsic Viscosity | Drawing Magnification (Times) | Tensile Strength (g/d) | Initial Modulus (g/d) | Knot Strength (g/d) | Crystalline Orientation Degree (%) | Contrast Glossiness (%) |
| --- | --- | --- | --- | --- | --- | --- | --- |
| dry-jet wet Example 3 | 2.6 | 13.1 | 12.1 | 217 | 2.7 | 94.3 | 22.8 |
| dry-jet wet Comparison Example 1 | 1.9 | 9.1 | 8.7 | 178 | 1.6 | 92.6 | 25.1 |
| dry-jet wet Comparison Example 2 | 1.3 | 8.2 | 6.9 | 154 | 1.1 | 91.0 | 27.2 |
| dry-jet wet Comparison Example 3 | 3.3 | 6.8 | 7.4 | 165 | 1.6 | 92.2 | 3.5 |
| wet Comparison Example 4 | 3.0 | 6.7 | 7.2 | 162 | 1.7 | 92.1 | 3.9 |
| wet Comparison Example 5 | 2.6 | 6.7 | 6.7 | 146 | 1.6 | 91.9 | 4.3 |
| wet Comparison Example 6 | 1.9 | 7.5 | 6.3 | 137 | 1.2 | 91.3 | 5.1 |
| wet Comparison Example 7 | 1.3 | 6.3 | 5.9 | 130 | 1.0 | 91.5 | 5.3 |

EXAMPLE 4 AND COMPARISON EXAMPLES 8 TO 12

99.7 mol % of AN and 0.3 mol % of 2-acrylamido-2-methyl-propanesulfonic acid were dissolved in DMSO followed by solution polymerization to prepare AN copolymers having intrinsic viscosities of 3.3, 1.7 and 1.2.

Polymer concentrations were adjusted to solution viscosities (45° C.) of these copolymer solutions of about 4,000 poise to prepare spinning solutions. The obtained spinning solutions were heated to 70° C. and subjected to the dry-jet wet spinning process through a spinning nozzle having 500 holes, each 0.12 mm in diameter.

The distance between of the spinning nozzle and the liquid surface of a coagulating bath was 3 mm. The distance from the liquid surface of the coagulating bath to the focusing guide was set 500 mm apart. A rate of taking the extruded filaments up was set to 10 m/min. As the coagulating bath, a DMSO aqueous solution at 15° C. was used.

After washing the obtained coagulated filaments with water of 50° C., the filaments were drawn by 5 times in hot water and an oil was imparted thereto followed by drying at 120° C. Then, the drawn filaments were subjected to secondary drawing in steam under pressure or to secondary drawing with dry heating to obtain drawn filaments having the maximum drawing magnification of 95%. The mechanical properties of fibers were measured. The results are shown in Table 2 below.

The filament fibers obtained in Example 4 showed a tension of 1.8 g/d in the secondary drawing with dry heating at 190° C., the degree of crystalline orientation of 94.5% and contrast glossiness of 21.2%; whereas the filament fibers obtained in Comparison Example 8 showed a tension of 0.8 g/d in the drawing described above; even although the drawing was made at greater ratio in the steam heat drawing than in the dry heating, both the strength and initial modulus were poor.

TABLE 2

| | Intrinsic Viscosity | Secondary Drawing | Drawing Magnification (Times) | Tensile Strength (g/d) | Initial Modulus (g/d) | Knot Strength (g/d) | Crystalline Orientation Degree (%) | Contrast Glossiness (%) |
| --- | --- | --- | --- | --- | --- | --- | --- | --- |
| Example 4 | 3.3 | dry heating | 13.8 | 13.1 | 237 | 3.3 | 94.8 | 21.2 |
| Comparison Example 8 | 3.3 | steaming | 15.9 | 9.5 | 175 | 1.9 | 93.2 | 19.7 |
| Comparison Example 9 | 1.7 | dry heating | 8.5 | 7.2 | 159 | 1.7 | 92.1 | 23.0 |
| Comparison Example 10 | 1.7 | steaming | 10.2 | 6.1 | 138 | 1.3 | 91.2 | 21.8 |
| Comparison Example 11 | 1.2 | dry heating | 7.0 | 6.4 | 160 | 1.6 | 91.4 | 27.1 |
| Comparison Example 12 | 1.2 | steaming | 8.8 | 5.2 | 123 | 1.1 | 91.0 | 26.5 |

EXAMPLES 5 TO 7 AND COMPARISON EXAMPLES 13 AND 14

99.5 mol % of AN 0.5 mol % of 2-acrylamide-2-methyl-propanesulfonic acid were dissolved in DMSO followed by solution polymerization to prepare AN copolymer having an intrinsic viscosity of 3.2.

Using the obtained copolymer solution, five kinds of spinning solutions having polymer concentrations of 4%, 8%, 14%, 15% and 16% respectively were prepared.

These spinning solutions were heated to 50° C. and subjected to dry-jet wet spinning, respectively.

The distance between a spinning nozzle and the liquid surface of a coagulating bath was set 10 mm apart. As the coagulating bath, a 30% DMSO aqueous solution at 15° C. was used.

The spinning solution having the polymer concentration of 4% showed a poor spinnability in which single yarns were adhered to each other, resulting in unsatisfactory spinning. Therefore, the spinning solutions other than this spinning solution were subjected to spinning.

Coagulated filaments obtained from the remaining four spinning solutions were drawn by 5 times in hot water, respectively. After washing with water, the filaments were strained at 110° C., dried and further subjected to a secondary drawing using a dry heating tube at 190° C. to obtain drawn filaments having the maximum drawing magnification of 90%. The physical properties of fibers of the obtained filaments are shown in Table 3 below.

TABLE 3

| | Spinning Solution Concentration (%) | Solution Viscosity (45° C., poise) | Drawing Magnification (Times) | Tensile Strength (g/d) | Initial Modulus (g/d) | Knot Strength (g/d) | Crystalline Orientation Degree (%) | Contrast Glossiness (%) |
|---|---|---|---|---|---|---|---|---|
| Examples | | | | | | | | |
| 5 | 16 | 3900 | 13.1 | 13.5 | 229 | 3.5 | 94.9 | 22.1 |
| 6 | 15 | 2900 | 13.3 | 13.1 | 225 | 3.3 | 94.8 | 18.9 |
| 7 | 14 | 2100 | 13.5 | 12.7 | 220 | 3.0 | 94.5 | 18.1 |
| Comparison Examples | | | | | | | | |
| 13 | 8 | 110 | 9.3 | 9.2 | 179 | 1.6 | 92.8 | 13.1 |
| 14 | 4 | 7 | — | — | — | — | — | — |

TABLE 4

| | Distance Between Nozzle Surface and Liquid Surface (mm) | Spun State |
|---|---|---|
| Comparison Example 15 | 0.5 | x |
| Example 8 | 1.5 | ○ |
| Example 9 | 3.5 | ⊙ |
| Example 10 | 7.0 | ⊙ |
| Example 11 | 15.0 | ○ |
| Comparison Example 16 | 25.0 | x |
| Comparison Example 17 | 30.0 | x |

⊙: Very good
○: Good
x: No good

EXAMPLES 8 TO 11 AND COMPARISON EXAMPLES 15 TO 17

100% AN was dissolved in DMSO followed by solution polymerization to prepare a polymer having an intrinsic viscosity of 3.2.

The polymer concentration of the obtained polymer solution was adjusted to 15% to prepare a spinning solution having a solution viscosity of 3700 poise at 45° C. The spinning solution was heated to 70° C. and subjected to dry-jet wet spinning in a coagulating bath of a 50% DMSO aqueous solution at 15° C. using a spinning nozzle having a pore diameter of 0.12 mmφ and a hole number of 200 H.

The distance between the spinning nozzle and the liquid surface of the coagulating bath in the dry-jet wet spinning was modified as indicated in Table 4 below. Spinning state was observed and the results are also shown in Table 4 below. In the dry-jet wet spinning described above, the distance from the liquid surface of the coagulating bath from the focusing guide was set 700 mm.

As shown in Table 4 below, the solution from the coagulating bath wetted the surface of the nozzle to render dry and wet spinning difficult, when the distance between the spinning nozzle and the liquid surface of the coagulating bath was 0.5 mm. On the other hand, when the distance exceeded 250 mm, adhesion between single yarns tended to occur before the extruded filaments were into the coagulating bath and, normal filament fibers could not be obtained. Namely, it is understood that stable dry-jet wet spinning becomes possible by setting the aforesaid distance between the spinning nozzle and the liquid surface of the coagulating bath in the range of 2 to 10 mm.

EXAMPLES 12 TO 16 AND COMPARISON EXAMPLES 18 TO 20

100% AN was dissolved in DMSO followed by solution polymerization to prepare a polymer having an intrinsic viscosity of 2.8.

The polymer concentration of the obtained polymer solution was adjusted to 15% to prepare a spinning solution having a solution viscosity of 3700 poise at 45° C. The spinning solution was heated to 70° C. and subjected to dry-jet wet spinning in a coagulating bath of a 50% DMSO aqueous solution at 15° C. using a spinning nozzle.

Spinning draft in the dry-jet wet spinning was modified as indicated in Table 5 below. Spinning state was observed and the results are also shown in Table 5 below. In the dry-jet wet spinning described above, the distance from the liquid surface of the coagulating bath from the focusing guide was set 700 mm. Dry heat drawn yarns were sampled at 80% of the maximum draw magnification, and the tensile strength of each sample was determined.

TABLE 5

| | Spinning Draft | Spun State | Tensile Strength (g/d) |
|---|---|---|---|
| Comparison Example 18 | 0.05 | x | — |
| Example 12 | 0.15 | ○ | 11.8 |
| Example 13 | 0.31 | ⊙ | 12.4 |
| Example 14 | 0.53 | ⊙ | 12.1 |
| Example 15 | 0.71 | ⊙ | 12.1 |
| Example 16 | 1.2 | ⊙ | 10.9 |
| Comparison Example 19 | 2.2 | ○ | 9.3 |
| Comparison Example 20 | 3.1 | ○ | 8.9 |

EXAMPLES 17 TO 19 AND COMPARISON EXAMPLES 21 TO 24

To 10 g each of AN fibers (obtained in Examples 1, 2 and 3 and Comparison Examples 2, 4 and 7) shown in Table 1, which had been cut into a fiber length of 5 mm, were added 10 g of craft pulp, 10 g of $Ca(OH)_2$, 10 g of $Al_2(SO_4)_3$ and 10 l of water, respectively. After stirring the mixtures, 460 g of portland cement was added thereto followed by stirring again. Subsequently, 200 ppm each of anionic polyacrylamide type cement flocculants (made by Sanyo Kasei, "Sanfloc" AH-330P) was added to the mixtures, respectively, with stirring at a low speed to prepare slurries having formed a floc of cement particles on the surface of the fibers. Each of the slurries obtained was transferred in a mold of 20 cm × 25 cm on which a wire of 50 mesh was put. After filtering, the system was pressed for 1 minutes under pressure of 100 kg/cm² to mold cement plates having a thickness of about 6 mm. An amount of the fibers to be mixed in each of the cement plates was 2 wt %, respectively. In the case of asbestos, a cement plate was mold only from asbestos (15 wt %) and cement.

Next, curing was performed at 20° C. at 100% RH for 1 day and then in water at 20° C. for 6 days.

Measurement of Bending Strength and Work Load of Rupture in Bending

A test piece was cut out of each of the cement plates. Bending strength was measured on the test piece in accordance with JIS-X-6911. Work load of rupture in bending was calculated from a stress-strain diagram in the bending rupture test.

Measurement of Impact Strength

A test piece cut out of each of the cement plates was subjected to impact test in accordance with JIS-X-7111 to determine impact strength.

Measurement of Specific Gravity

With respect to a test piece cut out of each of the cement plates, absolute dry weight, water holding weight and weight in water were measured. According to the following equation, a bulk density was calculated:

$$\text{specific gravity} = \frac{\text{absolute dry weight}}{\text{water holding weight} - \text{weight in water}}$$

Properties of each of the cement plates are shown in Table 6 below.

The cement plates of the present invention which had been reinforced with high tenacity acrylic fibers having a high modulus of elasticity possess a high bending strength that cannot be achieved with conventional acrylic fibers. At the same time, the fiber-reinforced cement plates of the present invention showed greatly increased work load of rupture in bending and impact strength and were excellent in capability of absorbing energy in rupture. In addition, the cement plates of the present invention exhibited the bending strength comparable to the conventional asbestos-reinforced cement plates and simultaneously, showed much more excellent impact resistance.

TABLE 6

| | | Property of Cement Plate | | | |
|---|---|---|---|---|---|
| | Reinforcing Fiber | Specific Gravity | Bending Strength $(Kg/cm^2)$ | Word Load of Rupture in Bending $(Kg \cdot cm/cm^2)$ | Sharpy Impact Strength $(Kg \cdot cm/cm^2)$ |
| Example 17 | Example 1 | 1.59 | 228 | 2.81 | 3.03 |
| Example 18 | Example 2 | 1.58 | 220 | 2.78 | 3.00 |
| Example 19 | Example 3 | 1.60 | 223 | 2.75 | 2.96 |
| Comparison Example 21 | Comparison Example 2 | 1.58 | 175 | 2.35 | 2.60 |
| Comparison Example 22 | Comparison Example 4 | 1.58 | 174 | 1.21 | 2.06 |
| Comparison Example 23 | Comparison Example 7 | 1.57 | 160 | 1.20 | 2.04 |
| Comparison Example 24 | Asbestos | 1.60 | 211 | 0.51 | 1.10 |

EXAMPLES 20 TO 22 AND COMPARISON EXAMPLES 25 TO 27

Using high molecular flocculants (Examples 20 to 22, Comparison Example 25), surfactants or oils (Comparison Examples 26 and 27) shown in Table 7 below, aqueous dispersions containing a 0.1% effective component were prepared. The AN fibers obtained in Example 2 shown in Table 1 were immersed in the aqueous dispersions at room temperature for 5 minutes. Using a centrifugal separator, excess moisture was removed. At this time, an amount of the flocculants, etc. to be applied was about 0.1 wt %. Then, the AN fibers were cut into a length of 5 mm without drying.

In order to determine cohesion between the obtained fibers and cement particles, the following method was used for measurement. Namely, 0.2 g (provided that 0.2 g each of $Al_2(SO_4)_3$ and $Ca(OH)_2$ was added only in Example 20) of the cut fiber obtained above was added to 0.2 l of water. After stirring the mixtures, 9.2 g of portland cement was added to the mixtures followed by stirring again. Then, 200 ppm each of an anionic cement flocculant (polyacrylamide partial hydrolysate, made by Sanyo Kasei Co., Ltd., strongly anionic "Sanfloc" AH-330P) was added to the mixtures, respectively, based on each of the solid contents while stirring at a low speed to fix cement particles onto the surface of the fibers. After each of the thus prepared slurries was stirred for 0 to 15 minutes using a stirrer of 400 rpm, the mixtures were filtered on a wire net of 40 mesh. The solids on the wire net were dried at 105° C. and the weights were measured to determine a cement retention rate. The results are shown in Table 7 below.

Next, cement plates were molded in a manner similar to Example 17 and, specific gravity and bending strength of each of the cement plates were measured. The results are also shown in Table 7 below.

As is evident from the measurement results on Examples 20 to 22 and Comparison Examples 25 to 27 shown in Table 7 below, when the fibers to which the nonionic or cationic high molecular flocculants were applied as in the present invention were used, the systems of the present invention are excellent in paper-making efficiency since the cement retention rate was large and the cement particles were fixed firmly onto the surface of the fibers in large quantities. In addition, the bending strength is large and the coming out of fibers on the face of the ruptured cement plates are not observed. On the other hand, in the cement plate obtained in Comparison Example 25 to which the anionic high molecular flocculant was applied, the cement retention rate was small and the properties of the cement plate were also poor. Further, in the cement plates obtained in Comparison Examples 26 and 27 to which conventional water-dispersible surfactant or oil were applied, the cement retention rate was small and the properties of the cement plates were poor, irrespective of the ionic nature.

flocculant to be applied to the fibers, polydimethylaminoethyl methacrylate (strongly cationic sample H) having a molecular weight of 3,000,000 was used. As cement flocculants used for adsorbing and bridging cement particles onto the surface of the fibers, anionic, nonionic and cationic high molecular flocculants as shown in Table 8 below were used. Otherwise in quite the same manner as in Example 20, slurries were prepared and, measurement of cohesion, molding of cement plates and bending test on the cement plates were performed. Results of respective measurements are shown in Table 8 below.

In case that cement particles were fixed onto the surface of the fibers using the anionic high molecular flocculants as in the present invention, the cement retention rate is large and, the bending strength of the cement plates is large. In case of using the anionic high molecular flocculants having molecular weight of 5,000,000 and 7,500,000, cement plates having high bending strength and good properties were obtained. On the other hand, in case that the nonionic or cationic high molecular flocculants are used as cement flocculants, the cement retention rate was small and the properties of the cement plates were poor.

TABLE 7

| | Kind of Molecular Flocculant and Surfactant (oil agent) | Ionic Nature | Molecular Weight | Cement Retention Rate (wt %) Stirring Time (minute) | | | | Property of Cement Plate | |
|---|---|---|---|---|---|---|---|---|---|
| | | | | 0 | 5 | 10 | 15 | Specific Gravity | Bending Strength (Kg/cm$^2$) |
| Example 20 | Polydimethylaminoethyl methacrylate "Orfloc" OX-101 Organo Co., Ltd. | cation | 7,500,000 | 85 (90)* | 66 (74)* | 50 (66)* | 36 (60)* | 1.59 | 243 |
| Example 21 | Mannich-modified polyacrylamide "Hi-moloc" M-566H Kyoritsu Yuki Co., Ltd. | cation | 8,000,000 | 77 | 56 | 42 | 32 | 1.59 | 238 |
| Example 22 | Polyacrylamide "Hi-moloc" SS-200H Kyoritsu Yuki Co., Ltd. | nonion | 11,000,000 | 70 | 50 | 34 | 28 | 1.58 | 232 |
| Comparison Example 25 | Polyacrylamide partial hydrolysate "Sanfloc" AH-330P Sanyo Kasei Co., Ltd. | anion | 10,000,000 | 50 | 20 | 14 | 8 | 1.60 | 215 |
| Comparison Example 26 | Acrylamide quaternary ammonium salt TY-4 Yoshimura Yuka Co., Ltd. | cation | 500 | 15 | 4 | 4 | 4 | 1.59 | 212 |
| Comparison Example 27 | EO adduct of dodecyl phenyl ether "Dodecapole 90" Sanyo Kasei Co., Ltd. | noion | 700 | 10 | 4 | 4 | 4 | 1.60 | 212 |

*containing Al$_2$(SO$_4$) and Ca(OH)$_2$

EXAMPLES 23 TO 27 AND COMPARISON EXAMPLES 28 AND 29

As AN fibers, the fibers obtained in Example 2 shown in Table 1 were used. As a cationic high molecular

TABLE 8

| | Kind of Cement Flocculant | Ionic Nature | Molecular Weight | Cement Retention Rate (wt %) Stirring Time (minute) | | | | Property of Cement Plate | |
|---|---|---|---|---|---|---|---|---|---|
| | | | | 0 | 5 | 10 | 15 | Specific Gravity | Bending Strength (Kg/cm$^2$) |
| Example 23 | Polyacrylamide partial hydrolysate (strongly anionic sample (AS-5) | anion | 3,000,000 | 40 (70) | 31 (54) | 24 (43) | 20 (35) | 1.58 | 247 |
| Example 24 | same as above (strongly anionic sample B) | anion | 5,000,000 | 71 (80) | 52 (69) | 40 (57) | 31 (50) | 1.60 | 264 |
| Example 25 | same as above (strongly anionic sample AS-3) | anion | 7,500,000 | 76 (85) | 59 (72) | 43 (63) | 35 (57) | 1.59 | 259 |
| | same as above | anion | 10,000,000 | 82 | 62 | 47 | 37 | 1.59 | 245 |

TABLE 8-continued

| | Kind of Cement Flocculant | Ionic Nature | Molecular Weight | Cement Retention Rate (wt %) Stirring Time (minute) | | | | Property of Cement Plate Specific Gravity | Bending Strength (Kg/cm²) |
|---|---|---|---|---|---|---|---|---|---|
| | | | | 0 | 5 | 10 | 15 | | |
| Example 26 | (strongly anionic sample AS-2) | | | (90) | (75) | (65) | (60) | | |
| | same as above | anion | 15,000,000 | 86 | 65 | 50 | 39 | 1.60 | 241 |
| Example 27 | (strongly anionic sample AS-1) | | | (95) | (80) | (70) | (62) | | |
| Comparison Example 28 | Polyacrylamide "Sanfloc" N-OP Sanyo Kasei Co., Ltd. | nonion | 5,000,000 | 56 (80) | 27 (48) | 16 (39) | 13 (35) | 1.58 | 225 |
| Comparison Example 29 | Polydimethylaminoethyl methacrylate "Orfloc" OX-101 Organo Co., Ltd. | cation | 7,500,000 | 18 (30) | 14 (15) | 11 (13) | 10 (11) | 1.57 | 214 |

COMPARISON EXAMPLES 30 AND 31

Using alkali-resistant glass fibers having a fiber length of 5 mm, a cationic high molecular flocculant, polydimethylaminoethyl methacrylate, having a molecular weight of 3,000,000 was applied thereto in a manner similar to Example 20 (except that the amount of the fibers to be mixed was adjusted to have the same volume percentage as in Example 20). As a cement flocculant, an anionic high molecular flocculant, polyacrylamide partial hydrolysate (strongly anionic sample B), having a molecular weight of 5,000,000 was used. Using this flocculant, cement particles were adsorbed to and bridged with the surface of the fibers to prepare slurries. Measurement of cohesion, molding of cement plates and bending test on the cement plates were performed. The results are shown in Table 9 below.

The effect was less on the glass fibers. Both the cement retention rate and bending strength of the cement plates were poor.

having an intrinsic viscosity of 2.5 to 3.5, and having a degree of crystalline orientation measured by wide-angle X-ray diffraction within a range of 93 to 97%, a tensile strength of at least 10 g/d, an initial modulus of at least 180 g/d, a knot strength of at least 2.2 g/d and a surface smoothness of at least 7% when expressed by the contrast glossiness.

2. A high tenacity acrylonitrile fiber as claimed in claim 1, wherein said acrylonitrile polymer is an acrylonitrile polymer having an intrinsic viscosity of 2.7 to 3.3.

3. A high tenacity acrylonitrile fiber as claimed in claim 1, wherein said acrylonitrile polymer is an acrylonitrile copolymer having an intrinsic viscosity of 2.6 to 3.5, comprising at least 95 mol % acrylonitrile and 0 to 5 mol % of a vinyl compound copolymerizable with said acrylonitrile, which has a degree of crystalline orientation of at least 94%.

4. A high tenacity acrylonitrile fiber as claimed in claim 1, wherein said tensile strength is at least 12 g/d, said initial modulus is at least 200 g/d and said knot strength is greater than 3 g/d.

TABLE 9

| | High Molecular Flocculant to be adhered to fiber | Cement Flocculant | Cement Retention Rate (wt %) Stirring Time (minute) | | | | Property of Cement Plate Specific Gravity | Bending Strength (Kg/cm²) |
|---|---|---|---|---|---|---|---|---|
| | | | 0 | 5 | 10 | 15 | | |
| Comparison Example 30 | Polydimethylaminoethyl methacrylate (molecular weight: 3,000,000 strongly cationic sample H) | Polyacrylamide partial hydrolysate (molecular weight: 5,000,000 strongly anionic sample B) | 58 | 26 | 19 | 16 | 1.60 | 192 |
| Comparison Example 31 | None | same as above | 55 | 24 | 15 | 14 | 1.60 | 190 |

We claim:

1. A high tenacity acrylonitrile fiber comprising an acrylonitrile polymer mainly composed of acrylonitrile

* * * * *